(12) United States Patent
Pajarre et al.

(10) Patent No.: US 6,188,409 B1
(45) Date of Patent: Feb. 13, 2001

(54) 3D GRAPHICS DEVICE

(75) Inventors: Eero Pajarre; Otto Chrons, both of Tampere (FI)

(73) Assignee: VLSI Solution Oy, Tampere (FI)

( * ) Notice: Under 35 U.S.C. 154(b), the term of this patent shall be extended for 0 days.

(21) Appl. No.: 09/159,585

(22) Filed: Sep. 24, 1998

(51) Int. Cl.$^7$ ................................................ G06T 15/00
(52) U.S. Cl. ............................................................. 345/430
(58) Field of Search .................. 345/419, 425, 345/430

(56) References Cited

U.S. PATENT DOCUMENTS

| | | | |
|---|---|---|---|
| 5,224,208 | * | 6/1993 | Miller, Jr. et al. .................... 345/425 |
| 5,809,219 | * | 9/1998 | Pearce et al. ......................... 345/426 |
| 5,864,344 | * | 1/1999 | Ikeo ..................................... 345/426 |
| 5,900,881 | * | 5/1999 | Ikeo ..................................... 345/426 |
| 5,956,043 | * | 9/1999 | Jensen .................................. 345/430 |

FOREIGN PATENT DOCUMENTS

| | | |
|---|---|---|
| 0 447 222 A3 | 9/1991 | (EP) . |
| 0 764 921 A1 | 3/1997 | (EP) . |
| 5298460 | 11/1993 | (JP) . |
| 9231402 | 9/1997 | (JP) . |
| WO 95/27268 | 10/1995 | (WO) . |

\* cited by examiner

*Primary Examiner*—Mark Zimmerman
*Assistant Examiner*—Huedung X. Cao
(74) *Attorney, Agent, or Firm*—Louis Woo

(57) ABSTRACT

A device (1) for presenting 3D graphics comprises means for defining one or more polygons for objects to be presented, means (2, 3, 4) for bump mapping, which comprises means (6) for storing a bump map and means (5) for fetching the bump map from the bump map storing means (6), and means for defining a direction vector of bump map normal at each vertex of a polygon, and means (13, 14, 17, 18, 19) for rasterizing images on a display device. The device (1) comprises further means (7) for producing an angle value which is used to rotate the direction vector of the bump map.

5 Claims, 2 Drawing Sheets

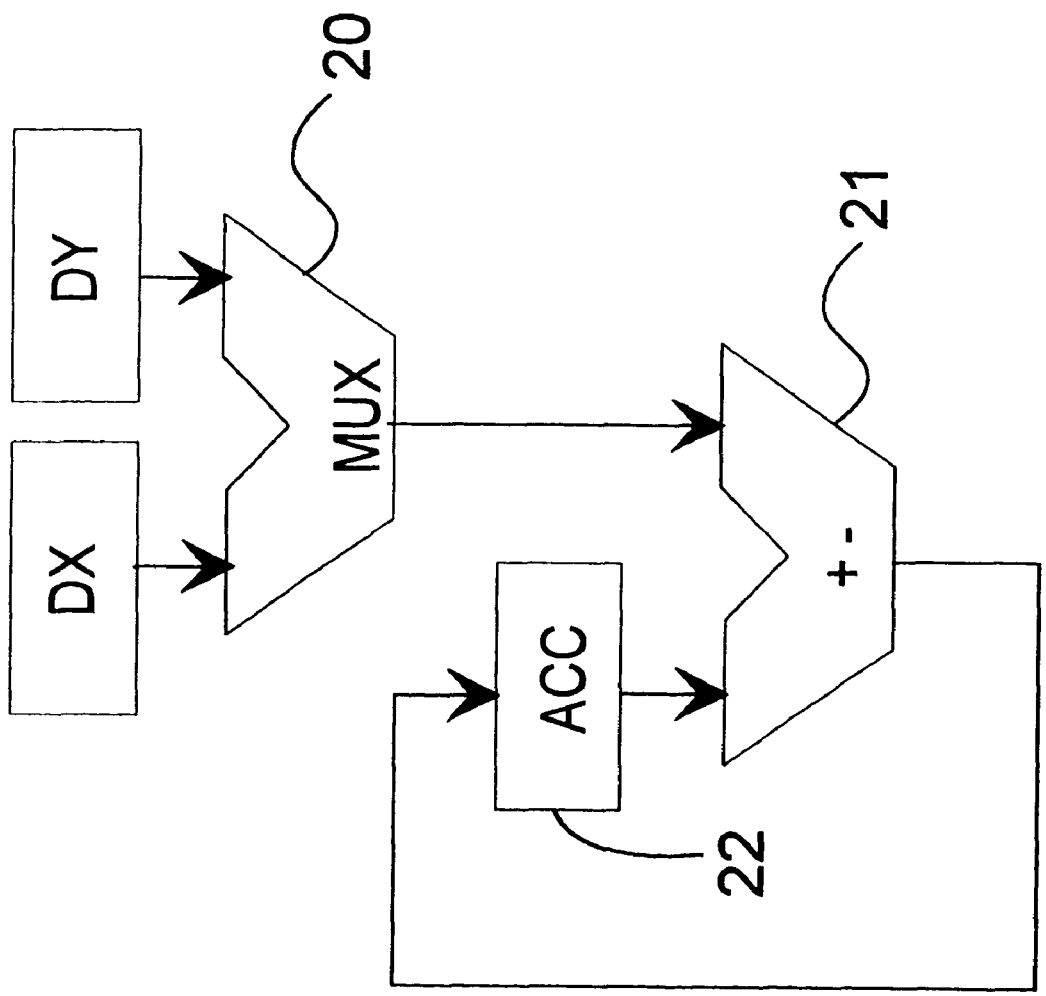

3D GRAPHICS DEVICE

FIELD OF THE INVENTION

The present invention relates to a device for presenting 3D graphics,

BACKGROUND OF THE INVENTION

One increasingly important application area for data processing units which are implemented as integrated circuits is rendering 3D graphics. Typically the 3D graphics rendering process consists of several tasks. Rendering process starts from high level application data which describes the scene to be rendered as a collection of objects. These objects are then translated to a suitable co-ordinate space for the rendering system and their different attribute values are computed. The translated object information is then converted in a process called rasterization to a set of data values for each pixel on the screen covered by the object.

In a typical implementations the object is represented with a set of polygons, for example triangles. For each corner (vertex) of the polygon the values for the pixel parameters are determined based on the object and environment properties. Then for each pixel in the polygon area the pixel parameters are generated either by linear interpolation or preferably using perspective correct interpolation.

The data values for each pixel can represent the color values corresponding to the pixel, X and Y co-ordinates of the pixel, a Z value which represent the pixel depth on the screen, and one or more surface map (texture) co-ordinate sets.

The last step of the rendering process assembles and combines this data stream with existing graphics state in order to create the final pixel values. The assembly process for a single pixel depends usually from several parameters, and also from the data of the pixels which have been previously rendered on the screen.

There has been provided some methods like texture mapping to improve image realism in prior art 3D graphics systems. Environment mapping is a technique for modelling the effect of the surrounding light sources on a diffuse surface, and generally the environment of a reflecting surface. It is based on creating a texture map representing the environment of the object to be rendered. This texture map can be created for example by doing a spherical projection of the environment, such as other objects and light sources on the scene.

Unlike a typical texture map this map does not have a fixed mapping to the object surface. Instead the co-ordinates for the texture map point which is to be mapped to the point in the object surface is determined dynamically. This mapping is typically based on the normal vectors of the surface. For example if a spherical projection environment map and a diffuse lighting model on the surface are used then the correct environment map co-ordinate of each point of the surface is directly the normal vector of the surface at that point, if the normal vector is represented using spherical co-ordinates. For fully reflecting surface the correct co-ordinate vector is obtained by mirroring the vector representing the direction of the observer from the surface point with the surface normal vector.

Typically it is valid to approximate the mapping described above, by just determining the correct environment map co-ordinates for each vertex of the polygons forming the surface, and by using linear or perspective correct interpolation between those co-ordinates.

As described above the environment mapping process is suitable for rendering smooth surfaces. For rendering realistic scenes a technique called bump mapping is used.

In bump mapping an additional, preferably two-dimensional texture map is associated with the surface. This so called bump map contains information on how the environment map co-ordinates corresponds to the surface having different surface normal vectors on different surface locations, creating an impression of a rough surface. The principle of bump mapping is described for example in a publication of Addison Wesley publishing company: "Fundamentals of three-dimensional Computer Graphics" written by Alan Watt, 1989.

In typical implementation it is also needed to specify somehow the orientation of the bump map. This is because if we observe a surface which is basically flat but with the bumps and if the surface is rotated using its main normal vector as the rotation axis, the visual effect of the bumps changes as the surface is rotated. Without specifying the bump map direction this can not be achieved in the rendering process. This is achieved by basing the perturbation on a co-ordinate system based on local surface derivatives.

In a typical scene for example the left and right edges of an object reflect the environment from almost opposite directions. This causes that the objects covers a large area of the total environment map. Because of this the bump map orientations on the different areas of the object can also be widely different.

It is possible to specify a single direction for each polygon forming the surface. This can lead to relatively simple implementation and it has been used in some prior art graphics systems, but it also leads to annoying artefacts on the areas where the different (adjacent) polygons meet on the object surfaces, carrying different bump map directions.

The bump mapping process is normally implemented by precalculation in a look up table which is preferably stored in read/write memory (RAM, Random Access Memory).

A European patent application EP 764 921 describes a computer graphics circuit to render image of light reflected shading. The bump normal is defined with two-dimensional pattern and stored in memory device. It is mapped onto the surface of arbitrary direction. Bump mapping rotates the surface normal (angle) with a bump normal. Interpolation for polygon filling is applied to the co-ordinates, texture mapping address, surface angle, and light-source angle (in a multiple light-source system). The bump-pattern is allocated in two dimensional u, v co-ordinates with a functional variable defined by horizontal and vertical angles, Bh and Bv, relative to the axis perpendicular to u, v co-ordinates. This pattern is stored in the read/write memory. This circuit still has the disadvantage mentioned above that the bump map normals with adjacent polygons may have significantly different directions especially on curved surfaces which leads to annoying artefact on such areas.

SUMMARY OF THE INVENTION

The purpose of the present invention is to eliminate the above mentioned drawbacks to a great extent and to provide a more efficient method and device for 3D rendering process. The invention is based on the idea of interpolating the bump map normal vectors. The method of the invention is characterized in what will be presented in the characterizing part of the appended claim 1.

The invention gives significant advantages. The rendering process is done significantly faster than using prior art techniques. The result of the rendering is also more realistic with less artifacts than with prior art systems. One further advantage of the present invention is that when the bump mapping is not used with some objects the bump map interpolation device can be utilized for other uses, like generating transparency coefficients for the objects.

BRIEF DESCRIPTION OF THE DRAWINGS

The invention will be described more closely in the following with reference to the appended drawings, in which FIG. 2 is a reduced block diagram illustrating an advantageous embodiment of an interpolating unit.

DETAILED DESCRIPTION OF THE INVENTION

Figure 1:
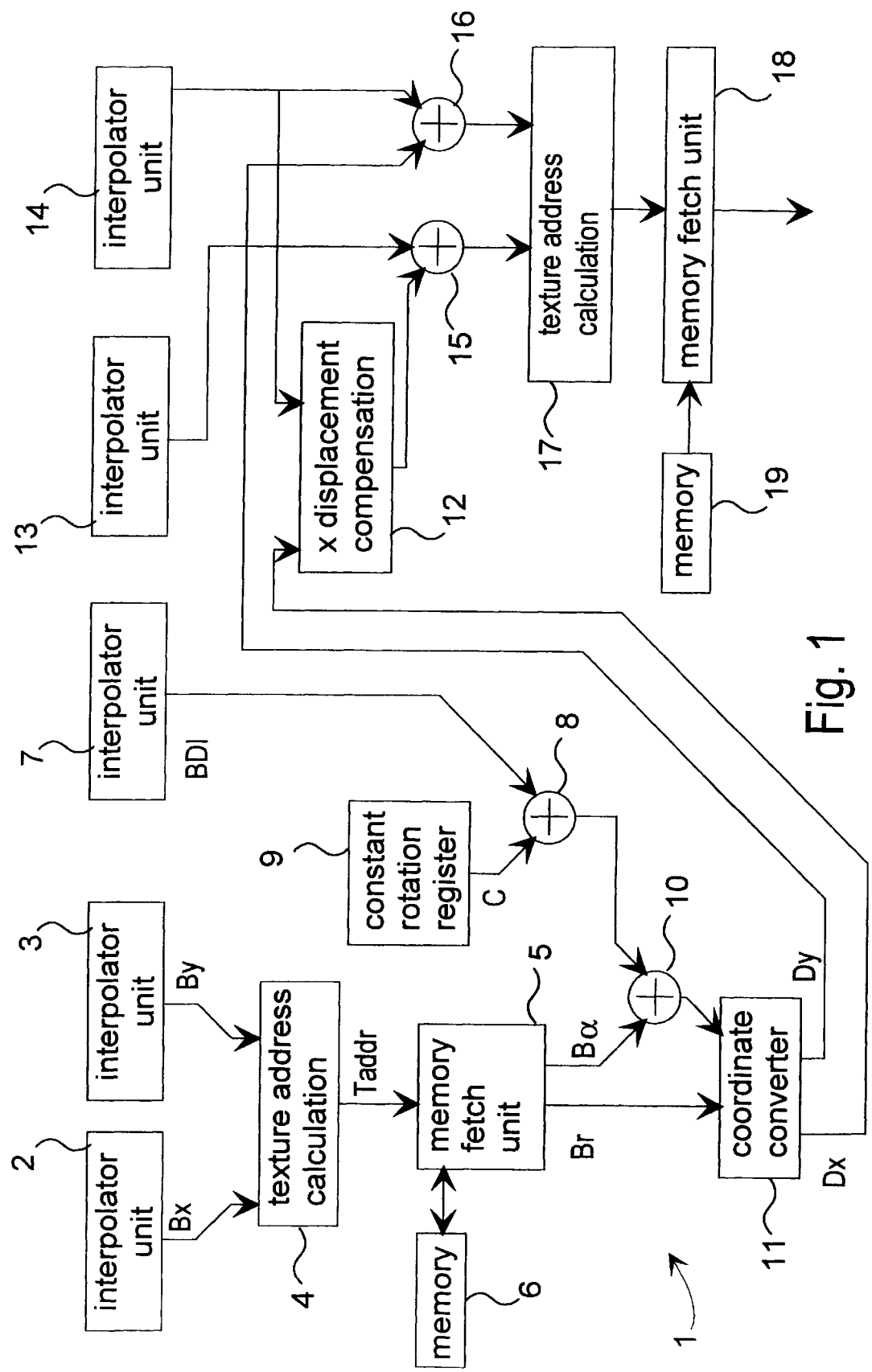
FIG. 1 is a reduced block diagram illustrating an advantageous embodiment of the graphic device according to the present invention.

In the following there is described a method according to an advantageous embodiment of the invention. Objects are defined as polygons, preferably triangles and bump map information is stored preferably in polar co-ordinate format in read/write memory 6 (FIG. 1). First, for every polygon the bump map direction BD at each vertex of the polygon is determined. The bump map direction is determined preferably in polar angular format. According to this invention the bump map directions at a vertex is calculated by using direction information of preferably all polygons of the object that converge on that point. It means that every converging polygon has advantageously the same direction information at that vertex. After that, when the polygons are to be rasterized, interpolated direction value BDI for the pixel in question is generated using similar interpolation technique which is used for generating the texture co-ordinate values for each pixel. The bump map co-ordinate values Bx, By are interpolated to get the texture co-ordinate address Taddr for the pixel in question.

The texture co-ordinate address Taddr is used to fetch the bump map information of the object from the memory 6. The fetched bump map information, which comprises the magnitude BM and direction BD information, is combined with the interpolated direction (angle) value BDI, and an optional constant angle value C by summing the angle values BD, BDI, C together. In prior art systems the direction of the bump map is presented as orthogonal co-ordinate values and the interpolation technique has not been used in hardware systems.

In some situations it may be unnecessary to use the interpolated direction value BDI but the constant value C instead.

In the next phase the resulting bump map value is first converted from polar co-ordinates to Cartesian co-ordinates and then these converted co-ordinate values Dx, Dy are used in modifying the texture address. Finally, the modified texture address MTaddr is used in fetching the environment map values (texture data) which also are stored preferably in read/write memory.

In such applications where spherical environment maps are used the method according to the invention can also use scaling of the x-co-ordinate by dividing it with $$\sin(\frac{\pi}{2}(1-|y|)),$$

where it is assumed that y=±1 at the poles of the sphere. This scaling compensates the fact that on the sphere surface the circumference of the circles around the north south axis get shorter nearer the poles, but if the trivial spherical map projection is used instead where the longitude and latitude co-ordinates are used as co-ordinates on a Cartesian map the width of the map does not change when going from the equator to the poles.

In FIG. 1 is a reduced block diagram illustrating an advantageous embodiment of the graphic device 1 according to the present invention. There are presented only the essential features of the graphic device 1. A first interpolator unit 2 calculates the x co-ordinate of the bump map of a rasterized point of a polygon. A second interpolator unit 3 calculates the y co-ordinate of the bump map of a rasterized point of a polygon. The respectively the calculated x and y co-ordinates are transferred to the texture address calculation unit 4, where the texture address Taddr for the point in question is calculated. The calculated address information from the texture address calculation unit 4 is transferred to the memory fetch unit 5. The memory fetch unit 5 generates from the calculated texture co-ordinates a memory fetch address. This address points to a memory location in an memory means 6, where the bump map information is stored. This memory location contains a bump map information for the surface point preferably in polar co-ordinate format. The address space reserved for every detail of the bump map depends on the application. It can consist of for example one byte for magnitude and one byte for direction (angle). A byte is typically 8 bits wide.

The third interpolator unit 7 determines the interpolated bump map direction value on that point. The interpolated direction value is summed in a first adder means 8 with a constant direction value which is fetched from constant rotation register 9. The result and the bump direction value fetched from the memory means 6 is further summed in a second adder means 10. The bump magnitude value fetched from the memory means 6 and the bump direction value from the second adder means 10 are converted from polar to Cartesian co-ordinates in the co-ordinate converting means 11 which generates bump x displacement value Dx and bump y displacement value Dy. The compensation means 12 compensates the bump x displacement value Dx by dividing it with $$\sin(\frac{\pi}{2}(1-|y|)),$$

where y is the y co-ordinate of the rasterized pixel.

In FIG. 1 is also presented fourth interpolator unit 13 and fifth interpolator unit 14. They are used to generate interpolated environment map co-ordinates from environment map information known as such. Interpolation can be linear or perspective corrected interpolation. Perspective corrected interpolation caters for the perspective impression. These environment co-ordinates are summed with bump displacement values in the third adder means 15 and fourth adder means 16, respectively. The third adder means 15 and fourth adder means 16 output the bump map corrected co-ordinate values which are used to fetch the texture information for that pixel. Texture address calculation means 17 uses the bump map corrected co-ordinate values to generate the texture address which is used by the second memory fetch unit 18 to get the texture information from the second memory means 19. Now, the second memory fetch unit 18 outputs the bump map corrected texture information of the current point.

It should be pointed out that although there is presented two memory fetch units 5, 18 and two memories 6, 19 they can also be realized as one memory fetch unit and one memory in real applications.

In FIG. 2 is a reduced block diagram illustrating an advantageous embodiment of an interpolating unit such as unit as shown in FIG. 1, 2, 3, 7, 13, 14. The interpolating unit 2, 3, 7, 13, 14 comprises a multiplexer unit 20 which selects one value from two input values. The input values are for example x displacement value DX and y displacement value DY. The output of the multiplexer unit 20 is connected to one input of the adder/subtracter unit 21. The other input of the adder/subtracter unit 21 is connected to output of accumulator 22. The output of the adder/subtracter unit 21 is connected to the input of the accumulator 22 and it is also the output of the interpolating unit 2, 3, 7, 13, 14.

When the interpolating is started (for ex. at the left edge of a polygon) the content of the accumulator 22 is either zero or it is initiated by an initial value.

The present invention is not limited merely to the embodiments presented above, but it can be modified within the scope of the appended claims.

What is claimed is:

1. A device for presenting 3D graphics comprising:

means for defining one or more polygons for objects to be presented, means for environment mapping, which comprises means for storing texture map and means for fetching the texture map information from the texture map storing means, means for bump mapping, which comprises means for storing a bump map and means for fetching the bump map from the bump map storing means, and means for defining a direction vector of bump map normal at each vertex of a polygon, means for modifying texture map coordinates based on the said bump map information by adding the bump map information as a 2D displacement to the texture map coordinates, and means for rasterizing images on a display device, characterized in that the device comprises further means for interpolating the bump map direction vectors by using the bump map direction values at vertices of the converging polygons for producing an angle value which is used to rotate the direction vector of the bump map to reduce annoying artifacts on the areas where the converging polygons meet on the object surfaces.

2. A device according to claim 1, characterized in that the angle value producing means comprises further means for combining a preferably constant angle value with the angle value generated by the angle value producing means.

3. A device according to claim 1 or 2, characterized in that the bump map is stored as a two-dimensional displacement map and the bump map values are modified pixel by pixel bases by combining the directional part of the bump map by adding it to an interpolated direction angle and/or to an angle value which is constant for the polygon.

4. A device according to claim 3, characterized in that the displacement in the first dimension (x) is scaled by a value calculated on the basis of the displacement in the second direction (y).

5. A device according to claim 4, characterized in that the scaling value is calculated by function $1/\sin(1-|y|)$.

* * * * *